(12) United States Patent
Yip et al.

(10) Patent No.: US 9,300,888 B2
(45) Date of Patent: Mar. 29, 2016

(54) METHODS AND SYSTEMS FOR LENS SHADING CORRECTION

(71) Applicant: Amlogic Co., Ltd., Santa Clara, CA (US)

(72) Inventors: Michael Yip, Los Altos, CA (US); Dongjian Wang, San Jose, CA (US); Xuyun Chen, San Jose, CA (US)

(73) Assignee: Amlogic Co., Ltd., Santa Clara, CA (US)

( * ) Notice: Subject to any disclaimer, the term of this patent is extended or adjusted under 35 U.S.C. 154(b) by 36 days.

(21) Appl. No.: 14/045,745

(22) Filed: Oct. 3, 2013

(65) Prior Publication Data

US 2015/0097969 A1   Apr. 9, 2015

(51) Int. Cl.
*H04N 9/64* (2006.01)
*H04N 5/208* (2006.01)
*H04N 5/228* (2006.01)
*H04N 5/357* (2011.01)
*H04N 17/00* (2006.01)

(52) U.S. Cl.
CPC ........... *H04N 5/3572* (2013.01); *H04N 17/002* (2013.01)

(58) Field of Classification Search
CPC .............................. H04N 5/3572; H04N 5/217
USPC ....................................... 348/251, 252, 222.1
See application file for complete search history.

(56) References Cited

U.S. PATENT DOCUMENTS

| | | | | |
|---|---|---|---|---|
| 8,102,445 B2* | 1/2012 | Kanemitsu et al. | ........... | 348/251 |
| 2003/0184763 A1* | 10/2003 | Ueki et al. | ..................... | 356/512 |
| 2005/0117114 A1* | 6/2005 | Jiang | .............................. | 351/177 |
| 2009/0043524 A1* | 2/2009 | Hung et al. | ...................... | 702/86 |
| 2009/0219419 A1* | 9/2009 | Kawasaka | ..................... | 348/251 |
| 2009/0268053 A1* | 10/2009 | Wang et al. | ................ | 348/229.1 |
| 2010/0053382 A1* | 3/2010 | Kuniba | ......................... | 348/242 |
| 2010/0265358 A1* | 10/2010 | Cabral et al. | ............... | 348/223.1 |
| 2010/0322532 A1* | 12/2010 | Jiang et al. | .................... | 382/274 |
| 2011/0234861 A1* | 9/2011 | Endo | ............................. | 348/243 |
| 2012/0038794 A1* | 2/2012 | Kumagai et al. | .............. | 348/234 |
| 2012/0249828 A1* | 10/2012 | Sun | ............................... | 348/223.1 |
| 2012/0287621 A1* | 11/2012 | Lee et al. | ...................... | 362/231 |
| 2013/0278730 A1* | 10/2013 | Hasegawa et al. | ............. | 348/49 |
| 2013/0342739 A1* | 12/2013 | Yanowitz et al. | ............. | 348/246 |
| 2014/0133749 A1* | 5/2014 | Kuo et al. | ..................... | 382/167 |
| 2014/0184813 A1* | 7/2014 | Cohen et al. | .................. | 348/187 |
| 2014/0204221 A1* | 7/2014 | Muukki et al. | ................ | 348/187 |
| 2014/0240587 A1* | 8/2014 | Cote et al. | ..................... | 348/371 |
| 2014/0293066 A1* | 10/2014 | Cabral et al. | .................. | 348/180 |
| 2015/0036018 A1* | 2/2015 | Chen et al. | ................. | 348/223.1 |

* cited by examiner

*Primary Examiner* — Chia-Wei A Chen
(74) *Attorney, Agent, or Firm* — Venture Pacific Law, PC (57) ABSTRACT

A method for calibrating an image capture device, comprises the steps of: applying lighting levels onto the image capture device; capturing luma values for the applied lighting levels; calculating luma gains for lens coordinates as a function of the applied lighting levels and the captured luma values, wherein each of the lens coordinates having multiple ones of the calculated luma gains; and storing the calculated luma gains to calibrate the image capture device.

14 Claims, 8 Drawing Sheets

| Lighting Levels | ... | ... | Luma Gains (x-1,y-1) | Luma Gains (x,y) | Luma Gains (x+1,y+1) | ... | ... |
|---|---|---|---|---|---|---|---|
| 255 | ... | ... | 1.21 | 1.20 | 1.21 | ... | ... |
| 128 | ... | ... | 1.72 | 1.50 | 1.75 | ... | ... |
| 32 | ... | ... | 1.82 | 1.80 | 1.78 | ... | ... |

| Lighting Levels | ... | Luma Gains (x-1,y-1) | ... | Luma Gains (x,y) | Luma Gains (x+1,y+1) | ... | ... |
|---|---|---|---|---|---|---|---|
| 255 | ... | 1.21 | ... | 1.20 | 1.21 | ... | ... |
| 128 | ... | 1.72 | ... | 1.50 | 1.75 | ... | ... |
| 32 | ... | 1.82 | ... | 1.80 | 1.78 | ... | ... |

METHODS AND SYSTEMS FOR LENS SHADING CORRECTION

FIELD OF INVENTION

This invention generally relates to methods and systems for image signal processing, and, in particular, to methods and systems for lens shading correction.

BACKGROUND

Typically, to capture a color image using a single charge coupled device ("CCD") or CMOS sensor, the sensor can record the image into an array of pixels to represent the color image. Each of the pixels has a digital pixel value (i.e., a number associated with the light intensity received by that respective pixel, e.g., a luma value for each pixel). A color filter array ("CFA") is typically used for measuring only light intensity from a single color component on any particular pixel.

Figure 1:
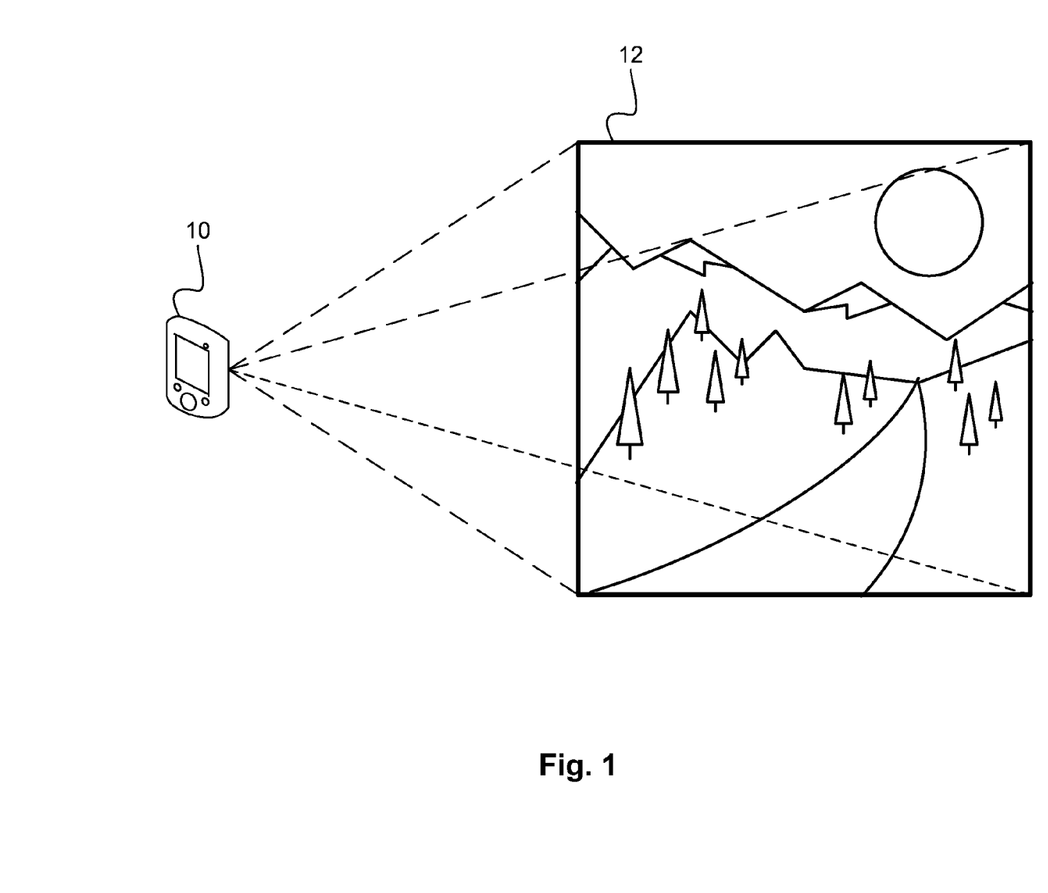
FIG. 1 illustrates an image capture device used for capturing an image.

FIG. 1 illustrates an image capture device used for capturing an image. The image capture device 10 (e.g., a mobile phone, a digital camera, video camera, a computing tablet, laptop, or other device) can capture luma values for an image 12. The luma values are stored on the image capture device for reproduction and viewing of the image by processing the luma values back into a displayable image.

However, a camera module of the image capture device 10 can suffer from a phenomenon called lens shading. This is caused by properties of the lens of an image sensor of the camera module. The effect of lens shading can be more pronounced depending on the angle of the lens at various areas of the lens. Furthermore, different colors (e.g., green, blue, or red) can have different responses to the curvature of the lens, which results distortion in the captured image.

Figure 2:
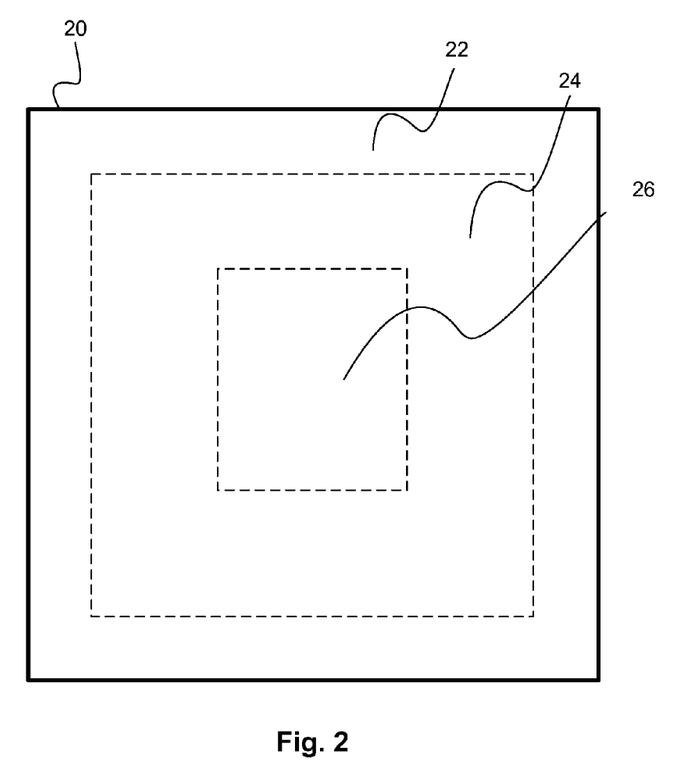
FIG. 2 illustrates various areas of a captured image that are affected by a lens shading effect of an image capture device.

FIG. 2 illustrates various areas of a captured image that are affected by a lens shading effect of an image capture device. If a lens 20 is used to capture an image, the image can be partitioned into several areas 22-26. In each of the areas 22-26, the luma values captured by the image capture device can vary for a uniform light incident on the image capture device due to the curvature of the lens and other minor variations of the image capture device.

Figure 3:
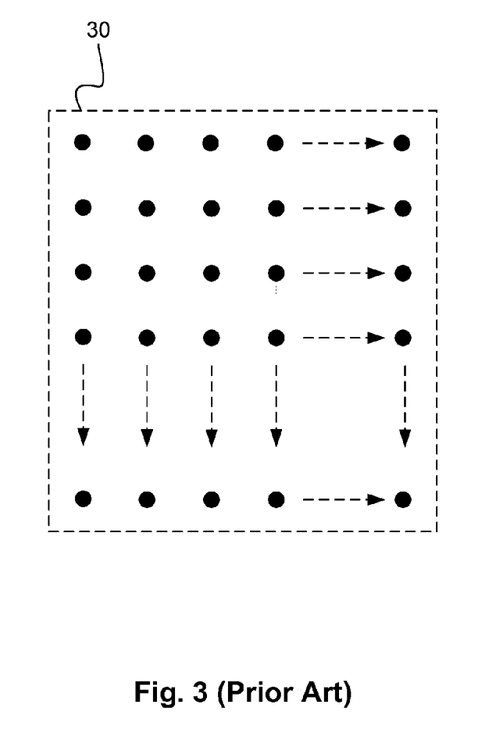
FIG. 3 illustrates a lens-shading correction mesh of the prior art.

Typically, lens shading is corrected by using a uniform lens shading correction mesh, where each point of the mesh has a single luma gain to be used for lens shading correction. FIG. 3 illustrates a lens-shading correction mesh of the prior art. A lens shading correction mesh 30 can have several lens coordinates arranged in a mesh 30. The lens coordinates are equidistant from each other and do not account for the curvature of the respective lens of the image capture device. Furthermore, each point of the mesh only has a single luma gain, regardless of the luminosity of the image to be captured. The single luma gain for each of the points does not account for nonlinearity of the lens shading phenomenon.

The methods of the current art for lens shading correction can result in a distorted captured image since (1) the current art does not take into account the curvature of the lens when creating a lens-shading mesh and/or (2) the current art does not take into account the nonlinearity of the lens shading phenomenon. Therefore, there exists a need for new methods and systems for calibrating an image capture device that accounts for the curvature of the lens and accounts for non-linearity of the lens shading phenomenon to generate true captured images.

SUMMARY OF INVENTION

An object of this invention is to provide methods and systems for lens shading correction of an image capture device.

Another object of this invention is to provide methods and systems for calibrating an image capture device that can account for a non-linear lens shading effect.

Yet another object of this invention is to provide methods and systems for calibrating an image capture device using a non-uniform lens-shading correction mesh.

Briefly, the present invention discloses methods and systems for calibrating an image capture device, comprising the steps of: applying lighting levels onto the image capture device; capturing luma values for the applied lighting levels; calculating luma gains for lens coordinates as a function of the applied lighting levels and the captured luma values, wherein each of the lens coordinates having multiple ones of the calculated luma gains; and storing the calculated luma gains to calibrate the image capture device.

An advantage of this invention is that methods and systems for lens shading correction of an image capture device are provided.

Another advantage of this invention is that methods and systems for calibrating an image capture device are provided that can account for a non-linear lens shading effect.

Yet another advantage of this invention is that methods and systems for calibrating an image capture device are provided using a non-uniform lens-shading correction mesh.

DESCRIPTION OF THE DRAWINGS

The foregoing and other objects, aspects, and advantages of the invention can be better understood from the following detailed description of the preferred embodiment of the invention when taken in conjunction with the accompanying drawings in which.

DETAILED DESCRIPTION OF THE PREFERRED EMBODIMENTS

In the following detailed description of the embodiments, reference is made to the accompanying drawings, which form a part hereof, and in which is shown by way of illustration of specific embodiments in which the present invention may be practiced.

Figure 4:
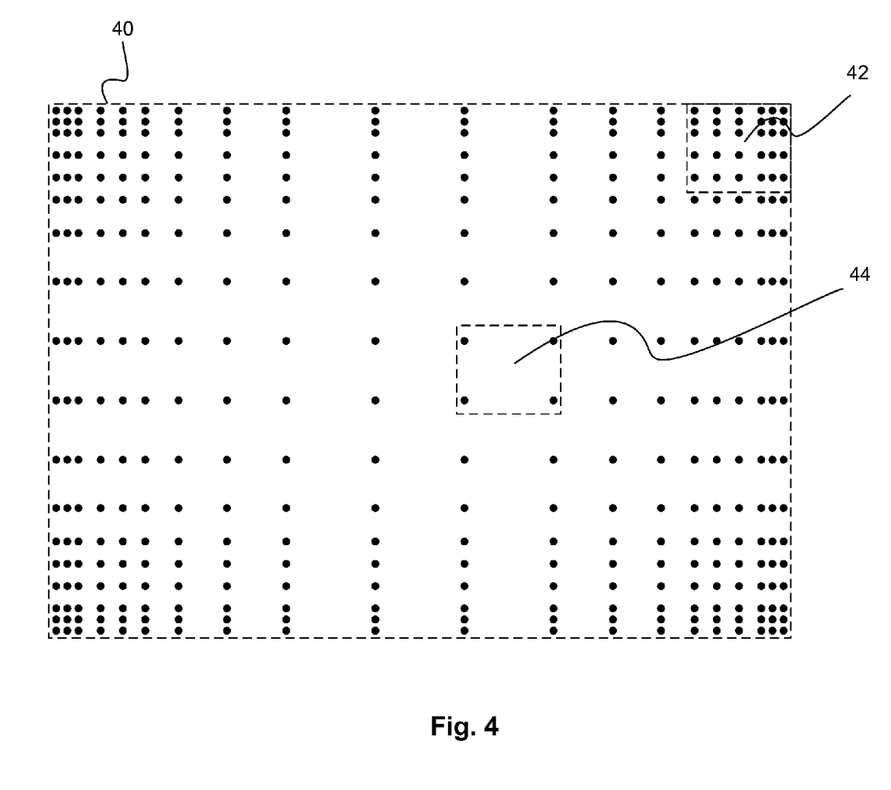
FIG. 4 illustrates a lens-shading correction mesh of the present invention.

FIG. 4 illustrates a lens-shading correction mesh of the present invention. A lens shading correction mesh 40 of the present invention comprises points, where the points are denser near the edges of the mesh 40 than the center of the mesh 40. The points of the mesh 40 can be referred to as lens coordinates of an image capture device, where each of the lens coordinates can have multiple luma gains for the respective lens coordinate. The lens shading correction mesh 40 can be superimposed on the lens of the image capture device for calibration. When the image capture device is calibrated, the lens coordinates of the mesh 40 can be generated based on the luma values of the pixels of the image capture device and of a calibration lighting level. If the pixel coordinates of the image capture device do not match up with the lens coordinates of the mesh 40, one or more nearest pixels to a lens coordinate can be used to interpolate one or more luma gains for that respective lens coordinate. In this manner, the mesh 40 can have interpolated luma gains for each of the points.

The luma gains stored for each of the lens coordinates of the mesh 40 can be used to be applied to pixels for a captured image. Generally, curvature of a lens of the image capture device is larger near the boundaries of the lens. Since the mesh can represent the lens and uses the lens coordinates, more points can be added to areas of the mesh that correspond to the boundaries of the lens. More points can mean that more luma gains are calculated, and ultimately used to apply a final or interpolated luma gain to pixels located in corresponding areas of the lens of the image capture device.

For instance, a first area 42 of the mesh 40 can have a higher density of points than a second area 44 of the mesh 40 since the first area 42 is closer to the boundary of the mesh (or the corresponding boundary of the lens) than the second area 44. An advantage of having more points in the boundary region is that interpolation of luma gains for pixels associated with those boundary areas are more accurate since there are more luma gain values to use and closer in proximity to the respective pixel coordinates that need to have a luma gain interpolated. Also, the boundary regions are most likely to have a higher rate of change in the value of the luma gains since the curvature of the lens is usually more pronounced at the boundaries of the lens.

Figure 5:
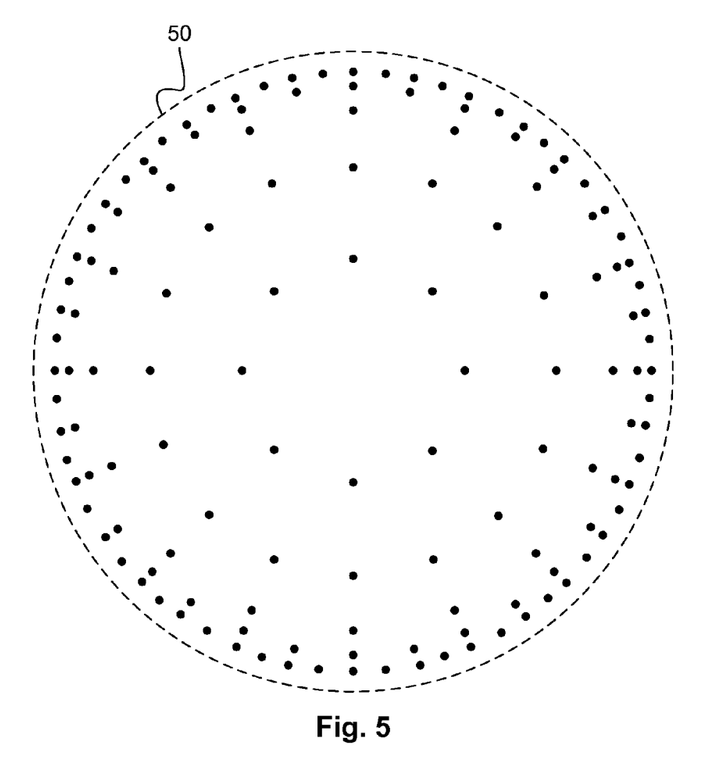
FIG. 5 illustrates an alternative embodiment of a lens-shading correction mesh of the present invention.

FIG. 5 illustrates an alternative embodiment of a lens-shading correction mesh of the present invention. A lens shading correction mesh of the present invention can be in various shapes from squares, to circles, to triangles, etc. For instance, a lens shading correction mesh 50 can be circular in shape, where the area of the mesh 50 near the outer boundary of the mesh 50 has a higher density of points that the inner area of the mesh 50.

In certain embodiments of the present invention, the points of the lens shading correction mesh can have a center point with other points being spiraled out from the center point, where the density of the points of the mesh increases per unit area as the points approach the boundary of the mesh. Also, a center point can be disposed in the middle of the lens shading mesh with concentric ellipses (e.g., circles) about the center point, where the distance between one ellipse and an adjacent ellipse decreases as the ellipses are located closer to the boundary of the mesh. The points near the boundary of the mesh can also be formed in a wavy pattern, having higher density of points near the boundary than at the center of the mesh.

Furthermore, a lens shading correction mesh can comprise of multiple patterns. For instance, a first pattern can be used to position points at a center area of the mesh and a second pattern can be used to position points at an outer boundary area of the mesh. The first pattern can be a spiral pattern of points and the second pattern can be a wavy pattern of points. Other combinations of patterns can also be apparent by a person having ordinary skill in the art. The mentioned patterns above are meant to be examples of such combinations, and are not meant to be limiting in any way.

Figure 6:
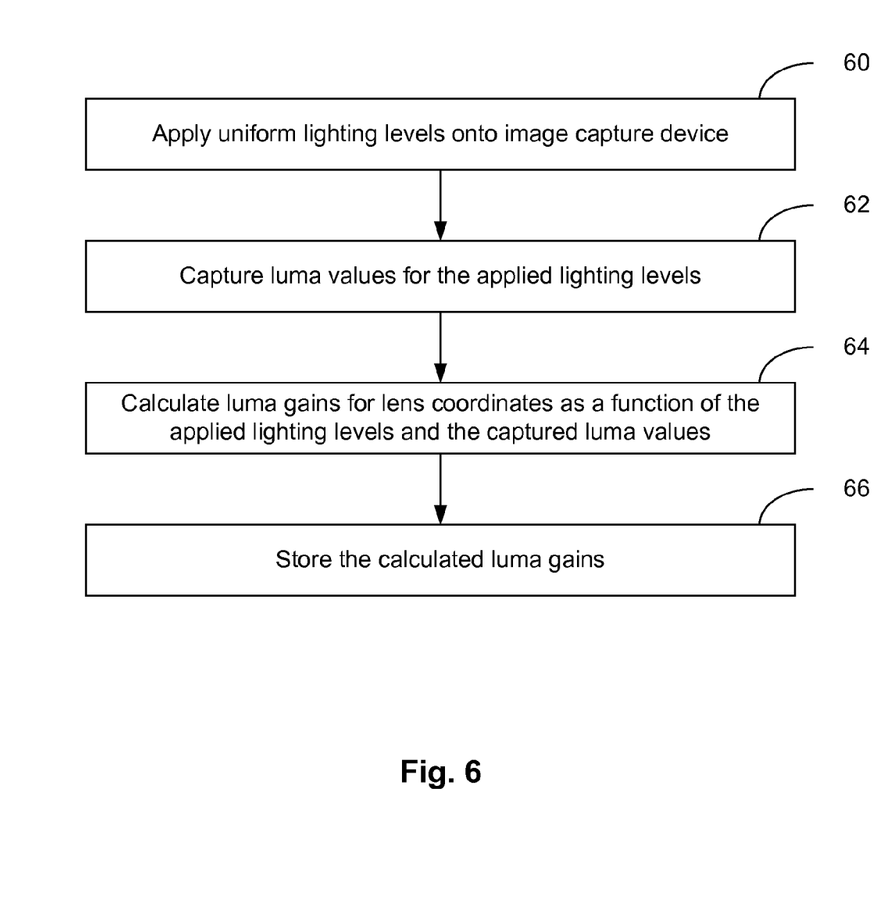
FIG. 6 illustrates a flow chart of the present invention for determining luma gains for lens coordinates of an image capture device.

FIG. 6 illustrates a flow chart of the present invention for determining luma gains for lens coordinates of an image capture device. In order to calibrate an image capture device, uniform lighting levels are applied 60 to an image capture device. The luma values for pixels of the image capture device are captured 62 at each of the applied lighting levels. For instance, a first uniform lighting level can be applied to the image capture device. While the first uniform lighting level is applied, the image capture device captures luma values for pixels of the image capture device for that uniform lighting level. Next, a second uniform lighting level can be applied to the image capture device. While the second uniform lighting level is applied, the image capture device captures luma values for pixels of the image capture device for that second uniform lighting level. These steps can be repeated for additional lighting levels to build up a listing of luma values for various lighting levels for each of the pixels.

This listing can be used to determine several luma gains for each of the pixels of the image capture device. The luma gains can be calculated 64 for the lens coordinates as a function of the applied lighting levels and the captured luma values. Once the luma gains are calculated for the lens coordinates, the calculated luma gains can be stored 66. The calculated luma gains can be stored in the memory of the image capture device in a look up table ("LUT").

For usage of the LUT, if the lens coordinates correspond to the pixel coordinates of the image capture device, then the luma gains at the lens coordinates can be directly used to calibrate the luma values at the respective pixel coordinates of the image capture device. If the lens coordinates and the pixel coordinates are not aligned, then the luma gains can be interpolated from the lens coordinates to fit pixel coordinates when used. For instance, if a pixel coordinate is between two lens coordinates, then the average of the luma gains for the two lens coordinates can be used to determine a luma gain for that particular pixel coordinate.

Figure 7:
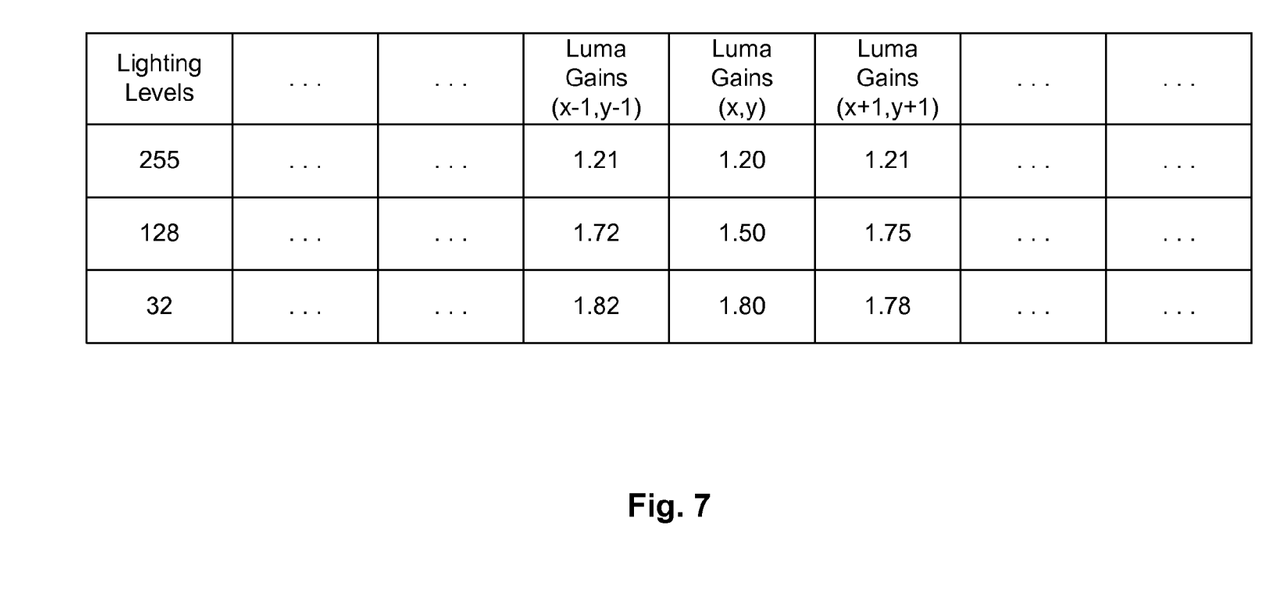
FIG. 7 illustrates an example of stored luma gains for a particular lens coordinate of the present invention.

FIG. 7 illustrates an example of stored luma gains for lens coordinates of the present invention. In an example of a LUT of the present invention, three lighting levels can be used for determining luma gains for each of the lens coordinates for points of a lens shading correction mesh. The first lighting level can be at a luma level 255. The second lighting level can be, at half that, of luma level 128. The third lighting level can be at the luma level 32. For each of the lighting levels, a luma gain can be calculated for each of the lens coordinates. For instance, at lens coordinate (x-1, y-1), the luma gain for the lighting level at 255 is 1.21; the luma gain for the lighting level at 128 is 1.72; the luma gain for the lighting level 32 is at 1.82. Thus, for each lens coordinate, there are at least three luma gains, where each of the luma gains can correspond to the intensity of the received lighting level on the image capture device. A person having ordinary skill in the art can understand that other numbers of predefined lighting levels can be used and positions of the lens coordinates can be adjusted. It is appreciated that the present invention can be used for other combinations of the LUT.

If the lighting level for a lens coordinate is not exactly equal to one of the predefined lighting levels of 255, 128, or 32, then luma gain values can be interpolated for that specific lighting level. For instance, assuming for the lens coordinate (x-1, y-1) the lighting level is at a lighting level 192, midway between lighting level 255 and lighting level 128, then the average value of the luma gains for lighting level 255 and 128 can be used to interpolate the luma gain value for the lens coordinate (x-1, y-1). Similarly, other interpolation methods can be used to determine luma gains for other lighting levels by using the determined lighting levels and luma gains in the LUT.

Figure 8:
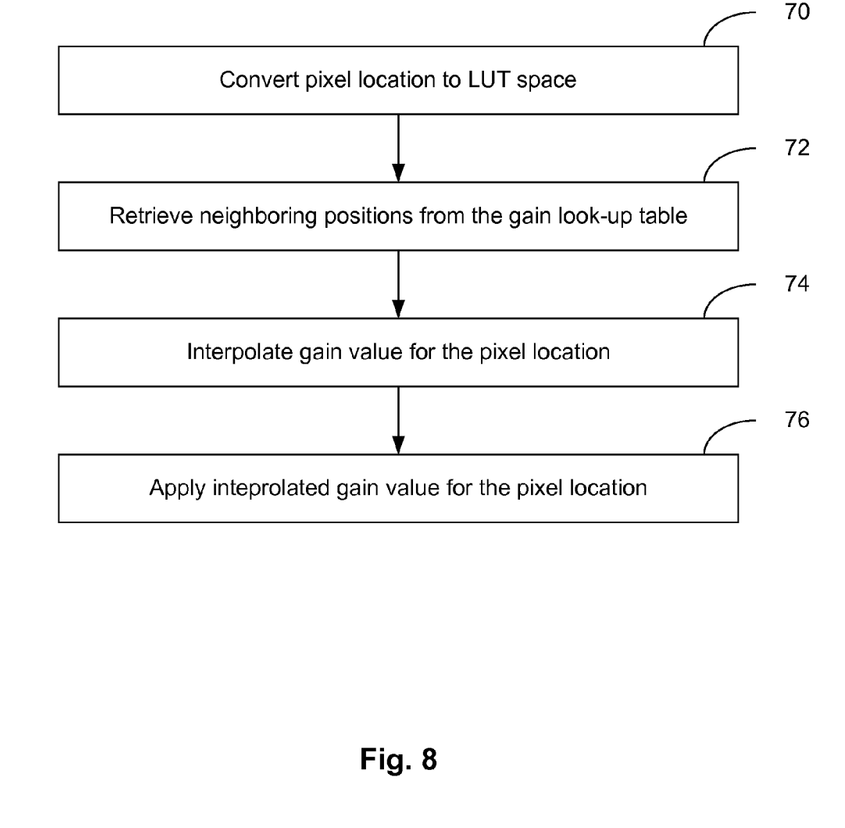
FIG. 8 illustrates a flow chart of a calibration method of the present invention using interpolation to determine the luma gains for pixels of an image capture device.

FIG. 8 illustrates a flow chart of a calibration method of the present invention using interpolation to determine the luma gains for pixels of an image capture device. When the image capture device captures an image, luma values are captured for the pixels of the image capture device. A previously stored LUT for the luma gains may be saved in terms of lens coordinates of the lens shading correction mesh. Each of the pixel coordinates can be converted 70 to the lens coordinates of the LUT space. Next, neighboring lens coordinates are retrieved 72 from the LUT along with the luma gains for each of the lens coordinates. The luma gain for the pixel location can be interpolated 74 from the retrieved luma gains of the neighboring lens coordinates. The interpolated luma gain can be applied 76 for the pixel location.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred apparatuses, methods, and systems described herein, but all those other and further alterations and modifications as would be apparent to those of ordinary skilled in the art.

We claim:

1. A method for calibrating an image capture device, comprising the steps of:
   applying lighting levels onto the image capture device;
   capturing luma values for the applied lighting levels;
   calculating luma gains for lens coordinates as a function of the applied lighting levels and the captured luma values, wherein each of the lens coordinates having multiple ones of the calculated luma gains; and
   storing the calculated luma gains to calibrate the image capture device,
   wherein the lens coordinates are positioned as a function of a distance of the respective lens coordinates from a boundary of the lens,
   wherein the lens coordinates have a first density within a first predefined distance from the boundary and a second density outside the first predefined distance from the boundary, and
   wherein the first density is greater than the second density.

2. The method of claim 1 wherein one of the multiple ones of the calculated luma gains for each of the lens coordinates is selected for calibrating the image capture device as a function of lighting levels of a captured image.

3. The method of claim 2 wherein the lens coordinates are pixel coordinates of the image capture device and wherein the selected luma gain for each of the lens coordinates are applied to the lighting levels of the captured image.

4. The method of claim 2 wherein the selected luma gain for each of the lens coordinates is used for interpolating luma gains for pixel coordinates of the image capture device.

5. The method of claim 1 wherein the applied lighting levels comprise a first lighting level, a second lighting level, and a third lighting level, wherein the first lighting level is greater than the second lighting level, and wherein the second lighting level is greater than the third lighting level.

6. The method of claim 1 wherein the lens coordinates are positioned as a function of the curvature of the lens.

7. The method of claim 1 wherein the first density having a first pattern and the second density having a second pattern.

8. The method of claim 7 wherein the first pattern is a spiral pattern and the second pattern is a wavy pattern.

9. A method for calibrating an image capture device, comprising the steps of:
   applying lighting levels onto the image capture device;
   capturing luma values for the applied lighting levels;
   calculating luma gains for lens coordinates as a function of the applied lighting levels and the captured luma values, wherein each of the lens coordinates having multiple ones of the calculated luma gains and wherein the lens coordinates are pixel coordinates of the image capture device; and
   storing the calculated luma gains to calibrate the image capture device, wherein one of the multiple ones of the calculated luma gains for each of the lens coordinates is selected for calibrating the image capture device as a function of lighting levels of a captured image,
   wherein the selected luma gain for each of the lens coordinates are applied to the lighting levels of the captured image,
   wherein the lens coordinates are positioned as a function of a distance of the respective lens coordinates from a boundary of the lens,
   wherein the lens coordinates have a first density within a first predefined distance from the boundary and a second density outside the first predefined distance from the boundary,
   wherein the first density is greater than the second density,
   wherein the first density having a first pattern and the second density having a second pattern, and
   wherein the first pattern is a spiral pattern and the second pattern is a wavy pattern.

10. The method of claim 9 wherein the selected luma gain for each of the lens coordinates is used for interpolating luma gains for pixel coordinates of the image capture device.

11. The method of claim 9 wherein the applied lighting levels comprise a first lighting level, a second lighting level, and a third lighting level, wherein the first lighting level is greater than the second lighting level, and wherein the second lighting level is greater than the third lighting level.

12. The method of claim 10 wherein the lens coordinates are positioned as a function of the curvature of the lens.

13. A method for calibrating an image capture device, comprising the steps of:
   applying lighting levels onto the image capture device, wherein the applied lighting levels comprise a first lighting level, a second lighting level, and a third lighting level, wherein the first lighting level is greater than the second lighting level, and wherein the second lighting level is greater than the third lighting level;
   capturing luma values for the applied lighting levels;
   calculating luma gains for lens coordinates as a function of the applied lighting levels and the captured luma values, wherein each of the lens coordinates having multiple ones of the calculated luma gains, wherein the lens coordinates are pixel coordinates of the image capture device, and wherein the lens coordinates are positioned as a function of the curvature of the lens; and
   storing the calculated luma gains to calibrate the image capture device,
   wherein one of the multiple ones of the calculated luma gains for each of the lens coordinates is selected for calibrating the image capture device as a function of lighting levels of a captured image,
   wherein the selected luma gain for each of the lens coordinates are applied to the lighting levels of the captured image, wherein the lens coordinates are positioned as a function of a distance of the respective lens coordinates from a boundary of the lens, wherein the lens coordinates have a first density within a first predefined distance from the boundary and a second density outside the first predefined distance from the boundary, wherein the first density is greater than the second density, wherein the first density having a first pattern and the second density having a second pattern, and wherein the first pattern is a spiral pattern and the second pattern is a wavy pattern.

14. The method of claim 13 wherein the selected luma gain for each of the lens coordinates is used for interpolating luma gains for pixel coordinates of the image capture device.

* * * * *